2,874,192

MERCAPTALS OF LONG CHAIN HYDROCARBON ALDEHYDES AND LONG CHAIN HYDROCARBON MERCAPTANS

Delmer L. Cottle, Highland Park, David W. Young, Westfield, Arnold J. Morway, Rahway, and Paul V. Smith, Jr., Westfield, N. J., assignors to Esso Research and Engineering Company, a corporation of Delaware No Drawing. Application May 29, 1953
Serial No. 358,572

5 Claims. (Cl. 260—609)

The present invention relates to organic materials useful as synthetic lubricants, anti-oxidants and for various other purposes. More specifically, the invention pertains to improved synthetic materials having excellent lubricating, oxidation-inhibiting, plasticizing and other desirable properties and to methods for making these materials. In its broadest aspect, the invention provides for new and improved lubricants, anti-oxidants and other valuable materials, such as extreme pressure agents, plasticizers, etc., which comprise mercaptals.

Prior to the present invention it has been suggested to use certain synthetic oils, particularly various esters of dibasic aliphatic acids as oil constituents for greases, engine oils, extreme pressure lubricants and related materials. While lubricants prepared on the basis of these esters have highly desirable lubricating qualities as well as excellent high and low temperature characteristics, many of these esters are easily hydrolyzed. It has also been proposed heretofore to use mercaptals of chloral as extreme pressure lubricants. However, the field of available raw materials for all these products is rather limited. In view of the rapidly increasing demand for synthetic lubricating oils in many fields, a broadening of the raw material basis is highly desirable. Similar conditions prevail in the field of plasticizers, anti-oxidants, extreme pressure agents and related materials.

It has now been found that a broad class of normally liquid mercaptals having at least 15 and up to about 130 carbon atoms per molecule may be substituted for mineral oil fractions and synthetic oils of the type described above in the production of lubricants, anti-oxidants, plasticizers and for various other uses. The term "mercaptal" as used herein refers to compounds containing an —S—CH$_2$—X— group wherein X is either a sulfur or oxygen atom. These mercaptals have excellent lubricating qualities and combine relatively high boiling points with desirably low pour points, high flash points, low viscosity-temperature coefficients, high chemical stability, good load carrying capacity and oxidation-inhibiting characteristics.

The mercaptals which may be used for the purposes of the invention have the general formula

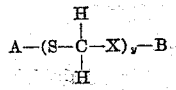

wherein X is either a sulfur or oxygen atom and y is an integer from 1–10. A and B are either the same or different organic radicals, such as hydrocarbon, alcohol, ester, ether or thio-ether radicals having 1–60 carbon atoms. While this broad group of compounds has utility in the fields of synthetic lubricants, plasticizers and various other additives, those representatives of the group which have pour points below about +35° F., flash points above about 300° F. and a viscosity of at least about 36 Saybolt seconds, Universal, at 210° F. have been found to be most suitable as lubricating oil bases.

Mercaptals suitable for the purposes of the present invention may be prepared by applying well known reactions between aldehyde and mercaptan groups to such compounds carrying these groups as will yield, upon condensation, mercaptals suitable for the purposes of the invention. For example, compounds bearing mercaptan and aldehyde groups may be combined under the action of suitable catalyst, such as a strong acid, e. g. sodium acid sulfate, sulfonic acids, hydrogen chloride, hydrochloric acid, sulfuric acid, the phosphorus acids, trichloroacetic acid or boron fluoride or the like and normally, though not necessarily, at temperatures of about 80°–347° F. Sulfuric acid should be used with care because of its oxidizing effect on mercaptans. The basic reaction may be illustrated by the general equation

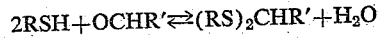

wherein R and R' are either the same or different hydrocarbon, alcohol, ester, ether or thioether radicals.

The aldehydes may be used in the form of monomers or polymers, such as paraldehyde, paraformaldehyde, etc. Mixtures of different aldehydes may also be used. The mercaptan compounds may be used individually or in the form of mixtures derived from synthetic sources or natural sources, such as petroleum. Mercaptans may also be formed by the reduction of disulfides or polysulfides in situ during the mercaptal formation.

Another method of preparing mercaptals suitable for the purposes of the invention involves the reaction of dichlorodimethyl ether with compounds containing mercapto groups or mercapto and alcohol groups, under the influence of heat or in the presence of various bases. The reaction may be illustrated by the following equations.

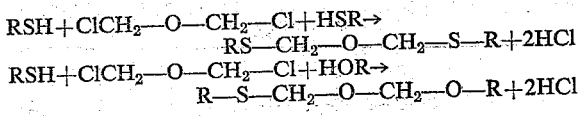

In these reactions the R's need not be similar. They may be simple hydrocarbon groups or any combination of reduced or oxidized hydrocarbon groups that hold a hydroxyl or sulfhydryl group as shown. Both alcohols and mercaptans may be primary, secondary or tertiary.

In accordance with the preferred embodiment of the invention, the mercaptals used have branched-chain radicals R, R', A and/or B. Thus, it has been found that good results are consistently obtained when using a group of new mercaptals which are derived from the product or by-product aldehydes and/or alcohols of the well known "Oxo" synthesis. This process involves the catalytic reaction of olefins with carbon monoxide and hydrogen at elevated temperatures of about 300°–400° F. and pressures of about 2500 to 4000 p. s. i. g. to form, particularly in the presence of cobalt catalysts, aldehydes having one carbon atom more than the olefin originally used. The aldehyde may be catalytically hydrogenated to the corresponding alcohol which is recovered as overhead product by distillation of the reaction mixture. The distillation residue, i. e. the so-called "Oxo-bottoms," is rich in by-product alcohols of higher molecular weight.

While the exact composition of all these aldehydes and alcohols is not known, it is well established that they are mixtures of aldehydes or primary alcohols, at least a substantial proportion of which is of the branched-chain type. The aldehyde or alcohol product consists of such a mixture averaging 1 carbon atom more than the olefin originally fed to the "Oxo" synthesis. It has been found that these aldehydes and alcohols may be converted into new mercaptals of the general type defined above. Mercaptals derived from these Oxo products, having branched-chain hydrocarbon radicals containing at least 7, and preferably 10–20, carbon atoms each are preferred for the purposes of the present invention.

Novel mercaptals having excellent properties for the purposes of the invention may be derived from Oxo-aldehydes or Oxo-alcohols produced by reacting polymers and copolymers of $C_3$ and $C_4$ mono-olefins in the presence of oxonation catalysts as described above. Particularly desirable are the trimer, tetramer and pentamer of propylene. Also, suitable mixtures of these mono-olefins are readily available in refinery gases and processes for their conversion into liquid copolymers are well known in the art. In accordance with the most widely used of these processes, the olefins are contacted in liquid phase with a polymerization catalyst comprising phosphoric acid supported on kieselguhr. Other similar processes use as catalyst silica gel impregnated with phosphoric acid, or sulfuric acid, Friedel-Crafts catalysts, activated clays, and others. Polymerization conditions in the presence of phosphoric acid catalysts include temperatures of about 300°–500° F. and pressures of about 250–5000 p. s. i. g. The olefinic feed stocks normally contain about 15–60 mol percent of propylene, about 0.5–50 mol percent of butylenes and from 0.1–10 mol percent of isobutylene, the remainder being saturated hydrocarbons having 2–4 carbon atoms per molecule. In place of or together with these olefin mixtures, homopolymers such as the dimer and trimer of isobutylene as well as tri, tetra and penta propylene may be used.

The composition and structure of the $C_8$ Oxo-aldehyde obtained from a mixture of $C_7$ olefins of the type described above and more specifically of $C_7$ olefins derived from a refinery gas stream containing propylene and mixed normal and iso-butylenes are now well understood. This Oxo-aldehyde has the following analysis:

| Structure of $C_8$ Oxo-aldehyde Prepared From $C_3$-$C_4$ copolymer Heptenes | Percent |
|---|---|
| C—C(C)—C(C)—C—C—CHO | 29 |
| C—C(C)—C(C)—C—C—CHO (variant) | 25 |
| C—C—C(C)—C(C)—C—CHO | 17 |
| C—C—C(C)—C—C—C—CHO | 16 |
| C—C—C—C(C)—C—CHO | (incl.) |
| C—C—C(C)—C—C—CHO (with C branch) | 2.3 |
| C—C(C)(C)—C—C—C—CHO | 1.4 |
| 2-alkyl-aldehydes | 4.3 |
| others | 5.0 |
| | 100.0 |

Other Oxo-aldehydes are believed to have compositions generally analogous to that specified above, chain lengths and degree of branching depending on the type of olefins used. It is noted in this respect that even when pure straight-chain olefins are used as the starting materials, the aldehydes obtained consist at least to a substantial extent of branched-chain compounds. Oxo-alcohols are primary alcohols derived from Oxo-aldehydes by simple hydrogenation.

Specific mercaptans from which the mercaptals of the invention may be prepared are listed below. This list is representative rather than exhaustive and the invention is not limited to the use of the mercaptans named.

Methyl mercaptan
Ethyl mercaptan
Isopropyl mercaptan
t-Butyl mercaptan
n-Amyl mercaptan
2-hexyl mercaptan
n-Octyl mercaptan
Oxo-octyl mercaptan
n-Nonyl mercaptan
n-Decyl mercaptan
t-Dodecyl mercaptan
t-Pentadecyl mercaptan
n-Octadecyl mercaptan
Beta-mercaptoethanol
Ethyl 2-mercaptoethanoate
Methyl 3-mercaptopropanoate; "iso" octyl 3-mercaptopropanoate
3-mercapto-1-propanol; 1-mercapto-2-propanol
Oxo-decyl 3-mercaptopropionate
Oxo-decyl mercaptan
Oxo-tridecyl mercaptan
Benzyl mercaptan
Alpha-phenethyl mercaptan
Beta-phenethyl mercaptan
Phenyl mercaptan Examples of aldehydes suitable to be reacted with mercaptans of the type listed above to form the mercaptals of the invention are listed below.

Formaldehyde
Acetaldehyde
Propionaldehyde
n-Butyraldehyde
Isobutyraldehyde
n-Valeraldehyde
Oxo-octylaldehyde
Capraldehyde
Oxo-tridecanal
Oxo-hexadecanal
Alpha-hydroxyadipaldehyde
Benzaldehyde
Terephthalaldehyde
2,3,5,6-tetramethyl terephthalaldehyde
Benzaldehyde
Phenyl acetaldehyde Examples of mercaptals derived from simple mercaptans and various aldehydes and having utility as lubricating oil bases, plasticizers, and/or anti-oxidants, etc. are tabulated below together with some of their more important characteristics.

TABLE I

| No. | Mercaptal From— Mercaptan | Mercaptal From— Aldehyde | Viscosity in cs. @ ° F. 210 | Viscosity in cs. @ ° F. 100 | Viscosity in cs. @ ° F. −40 | Viscosity in cs. @ ° F. −65 | Pour, °F. | Flash, °F. |
|---|---|---|---|---|---|---|---|---|
| 1 | Tertiary C$_{12}$ | Formaldehyde | 6.86 | 68.7 | | | −25 | 380 |
| 2 | Normal C$_{10}$ | ----do---- | | | | | >70 | |
| 3 | Normal C$_{12}$ | ----do---- | | | | | >70 | |
| 4 | ----do---- | Acetaldehyde | 4.38 | 18.0 | | | +25 | 485 |
| 5 | Tertiary C$_{12}$ | ----do---- | 9.0 | 124.0 | | | −20 | 350 |
| 6 | Normal C$_{12}$ | Propionaldehyde | 4.10 | 16.55 | | | +20 | 440 |
| 7 | Tertiary C$_{12}$ | ----do---- | 8.22 | 108.1 | | | −15 | 335 |
| 8 | Normal C$_8$ | 2-ethyl-hexaldehyde | 2.58 | 9.74 | 840 | 4,039 | <−75 | 370 |
| 9 | ----do---- | C$_8$ Oxoaldehyde | 3.01 | | 1,447 | 9,770 | −70 | 395 |
| 10 | Tertiary C$_{12}$ | ----do---- | 3.29 | | 12,639 | | <−75 | 320 |
| 11 | Normal C$_{12}$ | ----do---- | 4.26 | | | | +10 | 430 |

The following table indicates the method of preparation used for the above mercaptals listed in Table I. The reaction temperatures ranged from about 160°–400° F.

TABLE II

| No. | Mercaptan | Aldehyde | Catalyst | Entrainer |
|---|---|---|---|---|
| 1 | 430 g. t-C$_{12}$ | 30 g. Paraformaldehyde | 5 cc. conc. HCl | None. |
| 2 | 258 g. n-C$_{10}$ | 37.5 g. 40% Formaldehyde | ----do---- | Do. |
| 3 | 202 g. n-C$_{12}$ | ----do---- | ----do---- | Do. |
| 4 | 202 g. n-C$_{12}$ | 44 g. Paraldehyde | 5 g. p-toluene-sulfonic acid. | Do. |
| 5 | 202 g. t-C$_{12}$ | ----do---- | ----do---- | Do. |
| 6 | 202 g. n-C$_{12}$ | 56 g. Propionaldehyde | ----do---- | Do. |
| 7 | 202 g. t-C$_{12}$ | ----do---- | 5 g. Sulfuric Acid | Do. |
| 8 | 292 g. n-C$_8$ | 128 g. 2-ethylhexaldehyde | 5 g. p-toluene-sulfonic acid. | Do. |
| 9 | 292 g. n-C$_8$ | 320 g. 40% Oxo C$_8$ aldehyde | ----do---- | Hexane. |
| 10 | 404 g. t-C$_{12}$ | ----do---- | ----do---- | Do. |
| 11 | 404 g. n-C$_{12}$ | ----do---- | ----do---- | Do. |

It will be noted that when a mercaptal is made from n-octyl mercaptan and C$_8$ Oxo aldehyde the flash point is 395° F. When t-dodecyl mercaptan and C$_8$ Oxo aldehyde are combined to form a mercaptal the resulting product has a flash point of 320° F. When the sulfur is substituted by oxygen, specifically in the combination of 2-ethylhexanol with 2-ethylhexaldehyde to form an acetal, the product appears to be less stable. Acetals in general appear to be less stable hydrolytically and thermally although very similar in structure to mercaptals. Formulas are an exception to this rule. Generally, it appears that stability among mercaptals as shown by a high flash point is particularly pronounced with those mercaptals that are derived from normal mercaptans.

Some of the mercaptals are less suitable as lubricating oil bases because they lack satisfactory low temperature properties or, like those made from primary mercaptans combined with formaldehyde, acetaldehyde and propionaldehyde, give mercaptals of excessively high pour points. These mercaptals may be used as anti-oxidants and plasticizers. However, C$_8$ aldehydes, such as 2-ethylhexaldehyde and C$_8$ Oxo aldehydes give products of exceptionally low pour points. Among the simple mercaptals the most nearly ideal combination of high and low temperature properties required for lubricating oil bases is found in the mercaptal from n-octyl mercaptan and C$_8$ Oxo aldehyde.

These special mercaptals of Oxo aldehydes, etc., such as the n-octyl mercaptal of C$_8$ Oxo aldehyde may also be blended with mineral oils, castor oil, other synthetic ester lubricating oils, such as di-C$_7$ Oxo alcohol adipate, etc., to form new lubricants for engine lubrication. They may also be compounded with pour point depressors, V. I. improvers, such as polymethacrylates and fumarate-vinyl ester copolymers, anti-oxidants, sludge dispersers, detergents, copolymers, polybutene, etc. and extreme pressure agents.

These mercaptals of Oxo aldehydes as well as the other mercaptals listed above may be added to rubbers, resins, waxes, etc., to form products of improved plasticity, elasticity and/or stability. When the materials are used along with unsaturated rubbers, the cure rate is advanced due to the presence of an active sulfur in the compounds. The mercaptals of Oxo aldehydes may further be used as hydraulic fluids and solvents and, under special conditions, as heat exchange fluids. When used as antioxidants, plasticizers, or other additive purposes, these mercaptals may be added in concentrations of, say, 0.001–10% by weight to mineral lubricating oils, synthetic lubricating oils of the ester, hydrocarbon, polymer, formal and other types, resins, synthetic rubbers, etc.

Those of the mercaptals which have beneficial lubricating oil qualities may be converted into greases of excellent temperature and load-carrying characteristics. For this purpose, metal soaps of high molecular weight fatty acids, soap-salt complexes of high molecular weight fatty acids and low molecular weight aliphatic acids or other conventional grease thickeners may be incorporated into these mercaptals in grease-making proportions by well known grease-making processes.

A particular or preferred group of simple mercaptals suitable for the purposes of the invention may be made by coupling two molecules of an oxygenated mercapto compound using a compound carrying a carbonyl group as the coupling agent. The starting material may be a mercapto acid or its ester, mercapto glycols and -polyglycols and their esters and ethers, including dibasic acid glycol esters, etc. The coupling agent may be an inexpensive aldehyde such as formaldehyde, acetaldehyde or an Oxo aldehyde. The Oxo aldehyde moreover need not be pure but may be the crude product obtained in the Oxo process.

Mercaptals formed from these materials may be illustrated by the general formulae given below.

ROOC—R—S—C—S—R—COOR, monobasic acid ester mercaptal
HOR—S—C—S—ROH, glycol mercaptal
HOR—O—R—S—C—S—R—O—ROH, polyglycol mercaptal
R—COO—R—S—C—S—R—OOC—R, glycol ester mercaptal
R—COO—R—O—R—S—C—S—R—O—R—OOC—R, polyglycol ester mercaptal
R—O—R—S—C—S—R—O—R, glycol ether mercaptal
R—O—R—O—R—S—C—S—R—O—R—O—R, polyglycol ether mercaptal

ROOC—R—COO—R—S—C—S—R—
                              OOC—R—COOR, dibasic acid glycol ester mercaptal Specific examples include the following:

Mercaptal from $C_8$ Oxo aldehyde and "iso" or "Oxo" octyl-2-mercaptoethanoate

Mercaptal from $C_{13}$ Oxo aldehyde and "iso" or "Oxo" tridecyl-3-mercaptopropanoate Mercaptal from formaldehyde and "iso" or "Oxo" heptyl-mercaptosuccinate The production of this type of compounds will be described hereinafter using mercaptals made by coupling 2 moles of mercapto acid esters with aldehydes as examples. The reactions involved are as follows:

$2HS(CH_2)_n$—COOH + HOR →
$2HS(CH_2)_n$—COOR + $2H_2O$

R'CHO + $2HS(CH_2)_n$COOR →
R'CH(S(CH_2)_nCOOR)_2 + $H_2O$ or, the steps may be reversed as follows:

R'CHO + $2HS(CH_2)_n$COOH →
R'CH(S(CH_2)_nCOOH)_2 + $H_2O$

R'CH(S(CH_2)_nCOOH)_2 + 2ROH →
R'CH(S(CH_2)_nCOOR)_2 + $2H_2O$

R and R' may be alkyl or aryl groups, particularly branched-chain alkyl groups preferably derived from an Oxo product, while $n$ may be an integer of 1–20. Ketones, keto acids and other carbonyl-substituted compounds may be used. The products obtained from ketones are of relatively lower stability than those derived from aldehydes or β-keto-acids. Aldehydic alcohols, such as alpha-hydroxyadipaldehyde, unsaturated aldehydes such as acrolein and crotonaldehyde, aromatic aldehydes such as benzaldehyde and substituted benzaldehydes are within the scope of the invention.

The acids may include any acid which has a mercapto (—SH) group attached to carbon in place of one of its hydrogen atoms. The mercapto acid may be unsaturated or further substituted by groups other than the mercapto group, such as the halogens, ether groups, ester groups, nitro groups, and CN groups.

The alcohols used to esterify the mercapto acid are preferably Oxo alcohols because they give products of excellent pour points. However, any alcohol or substituted alcohol, such as chloroethanol, aromatic alcohol or substituted aromatic alcohol, phenol or substituted phenol may be used to form the ester.

The mercaptal ester may be formed from the mercaptal acid, mercaptal acid chloride, mercaptal acid anhydride, other mercaptal ester by ester interchange, mercaptal acid amide by the action of alcohol with or without suitable alkaline or acid catalysts.

The formation of the mercaptal acid or mercaptal ester is suitably accomplished by acidic catalysts, such as hydrochloric acid, sulfonic acids, sodium acid sulfate or other suitable strong acids.

These esters may be used as solvents, plasticizers, or additives for petroleum products but their most valuable application is their use as synthetic lubricating oils and greases. The properties of 3 such mercaptal esters are set forth below:

The aldehydes and alcohols used in the preparation of these mercaptal compounds are readily available from well-known petro-chemical processes. The acids are derived from low priced acids as e. g. mercaptoacetic acid from sodium hydrosulfide and chloracetic acid; beta-mercaptopropionic acid from hydrogen sulfide and acrylic acid; and mercaptosuccinic acid from hydrogen sulfide and maleic acid. The mercaptal ester lubes listed above were prepared as described below; however the scope of the invention is not limited to these methods of manufacture.

*Product A.*—184 g. (2 moles) of mercaptoacetic acid and 1 mole of $C_8$ Oxo aldehyde (320 g. of a 40% solution) were refluxed with 8 g. of p-toluenesulfonic acid as catalyst and 50 cc. of hexane as water entrainer. After removal of water at a liquid temperature of 293° F. and below, 2 moles or 260 g. of $C_8$ Oxo alcohol were added and more water removed. The product was washed until neutral, and the residue distilling above 310° F. at 5 mm. Hg taken as product which probably has the formula $C_7H_{15}CH(SCH_2COOC_8H_{17})_2$.

*Product B.*—212 g. (2 moles) of beta-mercaptopropionic acid were mixed with 1 mole of $C_{13}$ Oxo aldehyde (660 g. of a 30% solution), 10 g. of p-toluenesulfonic acid and 200 cc. hexane. After removal of water at a liquid temperature of 220° F., 2.4 moles (480 g.) of $C_{13}$ Oxo alcohol were added and more water removed. After washing with alkali and stripping to 400° F. liquid temperature, the residue was taken as product. This product probably has the formula $$C_{12}H_{25}CH(SCH_2—CH_2COOC_{13}H_{27})_2$$

*Product C.*—150 g. (1 mole) of mercaptosuccinic acid was refluxed with 2 moles (232 g.) of $C_7$ Oxo alcohol in the presence of 4 g. of sodium acid sulfate with 100 cc. of hexane as an entrainer. After removal of 2 moles of water, 15 g. of paraformaldehyde (0.5 mole) was added and 8.2 cc. of water removed at a liquid temperature of 257° F. After washing with caustic and vacuum stripping to 440° F. liquid temperature, the residue was taken as product, which probably has the formula $$\underset{|}{COOC_7H_{15}}$$
$$CH_2(SCH—CH_2—COOC_7H_{15})_2$$

A third group of mercaptals useful for the purposes of the invention is obtained by reacting chloromethyl thioethers with dithioglycols, preferably stepwise to form complex mercaptals having the general formula $$AS(CH_2—S—R—S)_x—CH_2—S—B$$

wherein R is the hydrocarbon radical of a glycol, A and B may be an organic hydrocarbon, oxygenated or otherwise substituted radical and $x$ may be an integer of about 1–20. Examples of such complex mercaptals are listed below.

t-$C_{15}H_{31}$—S—$CH_2$—S—$C_2H_4$—S—$CH_2$—S—t-$C_{15}H_{31}$
n-$C_8H_{17}$—S—$CH_2$—S—$C_2H_4$—S—$CH_2$—S—n-$C_8H_{17}$
Oxo $C_{13}H_{27}$S—$CH_2$—S—$C_2H_4$—S—
$CH_2$—S$C_2H_4$—S—$CH_2$—S—n-$C_{12}H_{25}$

A still further group of useful mercaptals comprises compounds derived by reacting mercaptans and alcohols with aldehydes, particularly formaldehyde or the like, to form mixed mercaptal-formal compounds or monothio formals of the general formula R—S—C—O—R'' where-

TABLE III

| Aldehyde | Mercapto Ester From— | Pour, °F. | Flash, °F. | Viscosity in cs. 210° F. | Viscosity in cs. 100° F. |
|---|---|---|---|---|---|
| (A) $C_8$ Oxo Aldehyde | $C_8$ Oxo Alcohol + Mercaptoacetic Acid. | −50 | 415 | 5.43 | 32.7 |
| (B) $C_{13}$ Oxo Aldehyde | $C_{13}$ Oxo Alcohol + β-Mercaptopropionic Acid. | −60 | 425 | 8.37 | 63.2 |
| (C) Formaldehyde | $C_7$ Oxo Alcohol + Mercaptosuccinic Acid. | −40 | 400 | -------- | 137.0 | in R and R″ are the radicals, respectively, of the mercaptan and alcohol used. The preparation of these components may be as follows:

To 1 mole of the sodium or potassium salt of the mercaptan, slurried in 500 ml. of benzene, may be added dropwise 0.98 mole of the chloromethylether of the desired alcohol. When the reaction is complete the NaCl (or KCl) may be filtered off and the product washed successively with water, a saturated $Na_2CO_3$ solution, and again with water. After drying over $Na_2CO_3$, it may be stripped to remove undesirable low boiling components, such as unreacted starting materials. Some representative members of this group and their properties are listed below.

produced by incorporating small percentages, e. g. 2–30 wt. percent of an extreme pressure agent containing sulfur, phosphorus and/or halogen, such as well known active hydrocarbon derivatives containing both active halogen and active sulfur into the mercaptals of the present invention. Mercaptals such as those of the $C_4$ to $C_{20}$ Oxo aldehydes are particularly suitable for this purpose.

Lubricating greases in accordance with the invention may be prepared by incorporating into those mercaptals which have lubricating oil qualities, grease-making proportions, say about 5–40 wt. percent of a suitable metal soap, preferably an alkali or alkaline earth metal soap of a high molecular weight fatty acid having 10–30 carbon atoms per molecule, or a soap-salt complex consisting

TABLE IV

| Name of Material or Chemical Structure | Lorol*—S\CH₂/C₁₃Oxo—O | t—C₁₂H₂₅S\CH₂/C₁₃Oxo—O | t—C₁₆H₃₃—S\CH₂/C₁₃Oxo—O |
|---|---|---|---|
| Sample No. | 1 | 2 | 3 |
| Viscosity, SSU at 100° F. | 78.9 | 124.2 | 253.5 |
| Viscosity, SSU at 210° F. | 38.5 | 40.3 | 43.3 |
| Flash, ° F. | 425 | 385 | 420 |
| Pour, ° F. | +5 | −55 | −35 |
| Percent Sulfur | | | |

| Name of Material or Chemical Structure | t—C₁₆H₃₃—S\CH₂/nC₄H₉(OC₃H₇)₃O | Lorol*—S\CH₂/nC₄H₉(OC₃H₇)₃O | t—C₁₂H₂₅—S\CH₂/nC₄H₉(OC₃H₇)₃O |
|---|---|---|---|
| Sample No. | 4 | 5 | 6 |
| Viscosity, SSU at 100° F. | 172.2 | 70.1 | 103.0 |
| Viscosity, SSU at 210° F. | 43.3 | 38.0 | 39.6 |
| Flash, ° F. | 325 | 405 | 330 |
| Pour, ° F. | −40 | +70 | −55 |
| Percent Sulfur | | 9.23 | |

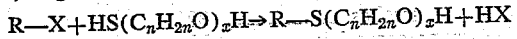
*"Lorol" is the tradename of a commercial monohydric alcohol product made by hydrogenation of coconut oil.

Also included in this group are mercaptals prepared by reacting the mercaptan reaction products of olefin oxides, such as for example $C_5H_{11}S—(CH_2—CH_2O)_3H$ with chloromethyl thioethers. These mercaptals have the structure $R—S—(C_nH_{2n}O)_x—CH_2—S—R$ where R may be any oxidized or reduced group of carbon atoms, preferably branched-chain alkyl radicals having at least 4 carbon atoms, $x$ an integer of at least 1 and $n$ being 2 or more. Any olefin oxide such as ethylene, propylene, etc. may be used. Also used are such oxides as trimethylene oxide, the furanes, the pentamethylene oxides, hexamethylene and substituted oxides such as epichlorohydrin, glycidol and furoic acid. However, the olefin oxides such as ethylene and propylene oxides are preferred.

R in these formulas may be a normal alkyl or Oxo alkyl group or a secondary, primary or tertiary alkyl group of any source whatever. Especially preferred are $C_5$ mercaptans and mercaptans of polymeric olefins such as are formed by the combination of hydrogen sulfide and di-isobutylene.

Products to be converted to mercaptals may also be made from alkyl halides and polyolefin glycol mercaptans, e. g.

$$R—X+HS(C_nH_{2n}O)_xH \rightarrow R—S(C_nH_{2n}O)_xH+HX$$

where X is halogen, R, $x$ and $n$ being as specified above.

The aldehydes useful for the mercaptalizing reaction include formaldehyde, trioxane, paraformaldehyde or aqueous solutions of formaldehyde, acetaldehyde, $C_8$ Oxo aldehyde, 2-ethylhexaldehyde, $C_{13}$ Oxo aldehyde. An acid catalyst may be used.

As pointed out before, all these mercaptals, provided they contain not substantially less than 15 carbon atoms and not substantially more than 130 carbon atoms per molecule may be used as lubricating oils, anti-oxidants, plasticizers, etc. Extreme pressure lubricants may be of the soaps of higher molecular weight fatty acids and the salts of low molecular weight fatty acids, such as acetic, furoic, acrylic, or similar acids. The metal soap or soap-salt complex may be added as such. For example, the preformed dry soap or complex may be slurried into the mercaptal and the mixture heated to 300°–500° F. while stirring until a homogeneous mass is obtained which is cooled to form the finished grease.

The invention will be further illustrated by the following additional examples.

Example I

An anti-friction bearing grease composed of a mineral oil thickened by the alkali fusion product of rapeseed oil was mixed with 0.5% by weight of the $C_8$ Oxo-mercaptal product 10 described above in Tables I and II. Samples of this grease were subjected to the Norma-Hoffman bomb oxidation test with the results tabulated below.

| Hours | No Anti-Oxidant Added, Pressure Drop (Lbs.) | 0.5% C₈ Oxo Mercaptal Added, Pressure Drop (Lbs.) |
|---|---|---|
| 96 | 5 | 0 |
| 144 | 12 | 0 |
| 450 | 33 | 16 |
| 500 | 50 | 25 |

It will be noted that a small amount of the mercaptal reduced the pressure drop (i. e. oxygen absorption) by more than 50%.

Example II

An amount of 0.25% by weight of the $C_{13}$ Oxo mercaptan reaction product on $C_8$ Oxo aldehyde was added to butyl rubber. After 14 days at 230° F. the molecular weight of the rubber had dropped 8%, as compared to a 62% drop for an uninhibited sample.

Some of the mercaptals described above were employed as dispersants for complex lithium soaps to form solid grease lubricants having excellent lubrication properties at extreme temperature ranges. Examples of greases employing these mercaptals are as follows:

Example III

Ingredients: Wt. percent
- Complex lithium soap—1:1 mol ratio of lithium soap of Hydrofol acid 54[1] and crotonic acid _____ 15.00
- Complex ester—$C_{13}$ Oxo aldehyde–$C_{13}$ Oxo alcohol-beta-mercaptopropionic acid (product B of Table III) _____ 84.00
- Phenyl alpha-Naphthylamine _____ 1.00

[1] Hydrogenated fish oil acids having a degree of saturation corresponding to commercial stearic acid.

The ester and the dry soap were mixed together and heated to 500° F. At this temperature the soap dissolved in the ester. The phenyl alpha-naphthylamine was added and dissolved, and the homogeneous molten mass was drawn into pans in shallow layers to cool. On cooling, the grease had the following properties after kettle homogenization.

- Appearance _____ Excellent, smooth uniform product.
- Dropping point, °F _____ 442.
- Penetrations, 77° F. mm./10:
  - Unworked _____ 265.
  - Worked 60 strokes _____ 285.
  - Worked 100,000 strokes (fine hole worker plate) _____ 320.
- Water solubility _____ 10% loss in water washing test.

Example IV

Ingredients: Wt. percent
- Complex soap—product of the co-neutralization of Hydrofol acid 54[1] and crotonic acid in a 1:1 mol ratio with lithium hydroxide _____ 15.0
- Mercaptal ester from $C_8$ Oxo aldehyde–$C_{13}$ Oxo alcohol-thioglycolic acid (see products of Table III) _____ 84.0
- Phenyl alpha-naphthylamine _____ 1.0

[1] Hydrogenated fish oil acids having a degree of saturation corresponding to commercial stearic acid.

This grease was prepared substantially as described in Example III.

Properties:
- Appearance _____ Smooth, uniform, short-fiber product.
- Dropping point, °F _____ 400.
- Penetrations, 77° F. mm./10—
  - Unworked _____ 280.
  - Worked 60 strokes__ 295.
  - Worked 100,000 strokes (fine hole worker plate) ___ 325.
- Low temperature properties, time/revolution of 204 bearing packed with grease at −40° F., seconds at 2,000 gram-cm. torque _____ 1.2.

In the above grease preparations the greases should be cooled rapidly since otherwise an undesirable soft structure may be obtained on working.

Example V

Ingredients: Wt. percent
- Complex lithium soap of a co-neutralized hydrogenated fish oil acid and acetic acid in a 1:1 mol radio _____ 15.0
- Phenyl alpha-naphthylamine _____ 1.0
- Di-t-dodecyl mercaptal of formaldehyde (No. 1 of Table I) _____ 84.0

*Preparation.*—The soap and mercaptal were mixed together while heating to 500° F. The inhibitor was added and the molten grease was then poured into pans and cooled. The cold grease was homogenized in a kettle by mixing.

Properties:
- Appearance _____ Smooth, homogeneous, orange color.
- Dropping point, °F _____ 462.
- Penetration, 77° F., mm./10—
  - Unworked _____ 180.
  - Worked 60 strokes __ 200.
  - Worked 100,000 strokes _____ 240.
- Norma-Hoffman oxidation test—Hours to 5 p. s. i. drop in oxygen pressure _____ 210.
- Copper corrosion _____ None.
- Extreme pressure properties, Almen machine test—
  - Weights carried ____ 15.
  - Pin condition _____ Pin scratched and slightly worn.

Example VI

Ingredients: Wt. percent
- Complex lithium soap (co-neutralized Hydrofol acid 54 and acetic acid in a 1:1 mol ratio) _____ 7.5
- Phenyl alpha-naphthylamine _____ 1.0
- Di-t-dodecyl mercaptal o fformaldehyde (No. 1 of Table I) _____ 91.5

*Preparation.*—The grease described in Example V was mixed with additional mercaptal and homogenized under high rates of shear.

Properties:
- Appearance _____ Smooth, uniform, yellowish orange.
- Penetrations, 77° F., mm./10—
  - Unworked _____ 285.
  - Worked 60 strokes __ 300.
  - Worked 100,000 strokes _____ 325.
- Copper corrosion _____ None.
- Dropping point, °F _____ 424.

Example VII

Ingredients: Wt. percent
- Lithium hydroxy stearate _____ 15.0
- Phenyl alpha-naphthylamine _____ 1.0
- Di-$C_{16}$ mercaptal or formaldehyde _____ 64.0
- Naphthenic type mineral oil having a viscosity of 40 SSU at 210° F _____ 20.0

*Preparation.*—The grease was prepared substantially as described in Example V.

Properties:
```
    Appearance_____ Smooth, uniform,
                                   yellow.
    Dropping point, ° F_____ 322.
    Penetrations, 77° F., mm./10—
        Unworked_____ 265.
        Worked 60 strokes_____ 285.
    Water solubility, boiling
        water_____ Insoluble.
    Extreme pressure properties, Al-
        men machine test—Weights
        carried_____ 15.
```

*Example VIII*

The products described in Table IV were blended in grease that was free of anti-oxidant. The greases were then evaluated in the Norma-Hoffman oxidation breakdown test at 212° F. Results are recorded in Table V.

TABLE V

1% BY WEIGHT OF MIXED MERCAPTAL ADDED TO GREASE

| Anti-Oxidant No. (From Table IV) | Time in Hours to a 5 lb. Pressure Drop | Time in Hours to a 10 lb. Pressure Drop |
|---|---|---|
| 1 | 60 | 89 |
| 2 | 150 | 225 |
| 3 | 228 | 298 |
| 4 | 240 | 360 |
| 5 | 217 | 350 |
| 6 | 140 | 200 |
|   | 255 | 365 |

It is to be noted that the mixed mercaptals that contain the tertiary group form the best anti-oxidants. In other mill breakdown tests it was found at 325° F. that the mixed mercaptals at 0.5% concentration were very good anti-oxidants for polybutene and for GR–I rubber.

*Example IX*

Lorol monosulfide–$C_{13}$ Oxo mono ether formal

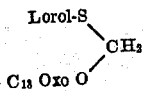

was prepared as follows:

To a mixture of 137 g. (0.64 mole) of Du Pont's "Lorol" mercaptan and 300 ml. of benzene was added 41.2 g. (0.62 mole) of potassium hydroxide. The mixture was refluxed until no more water was collected in the trap. Then 155 g. (0.62 mole) of the chloromethyl ether of $C_{13}$-Oxo alcohol was added dropwise. When the reaction was complete as indicated by cooling-off of the mixture, the potassium chloride was filtered off and the product was washed once with water, twice with saturated sodium carbonate solution and once again with water, then dried over sodium carbonate and stripped at 396° F. liquid temperature and 1 mm. Hg pressure. This material had a flash point of 425° F., a pour point of +5° F., a viscosity of 78.9 cs. at 100° F. and 38.5 at 210° F. A grease was prepared from this material as follows.

```
Ingredients:                                        Wt. percent
    Complex lithium soap¹_____ 15.0
    Mixed Lorol–C₁₃ Oxo mercaptal formal_____ 84.0
    Phenyl alpha-naphthylamine_____ 1.0
```

¹ Complex soap 1:1 mol ratio of Hydrofol 54 and crotonic acid co-neutralized and dried.

*Preparation.*—The grease was prepared by mixing the soap and mixed formal and heating to 500° F., until molten and then cooling rapidly in pans in thin layers.

Properties:
```
    Appearance_____ Smooth uniform grease—
                             slightly crystalline—re-
                             moved by homogeniza-
                             tion.
    Penetrations, 77° F.,
        mm./10—
        Unworked_____ 265.
        Worked 60 strokes_ 280.
        Worked 60,000
            strokes_____ 365.
    Dropping point, ° F___ 435.
    Norma-Hoffman Oxi-
        dation test, hours to
        a 5 p. s. i. drop in
        oxygen pressure____ 175.
    Almen machine test—
        Weights carried____ 8.
```

*Example X*

Mercaptal of tertiary $C_{12}$ mercaptan and $C_{13}$ Oxo alcohol. The method of preparation was similar to that of Example IX. This mercaptal had a flash point of 385° F., a pour point of 55° F. and a viscosity of 124.2 SSU at 100° F. and 40.3 SSU at 210° F. A grease was prepared as follows:

```
Ingredients:                                Wt. percent
    Complex lithium soap_____ 15.0
    Above formal-mercaptal_____ 84.0
    Phenyl alpha-naphthylamine_____ 1.0
```

*Preparation.*—As in Example IX.

Properties:
```
    Appearance_____ Slightly grainy grease on
                             working down from cake.
                             Homogenization removes
                             this slight grain or rough
                             texture.
    Penetrations, 77° F.,
        mm./10—
        Unworked_____ 250.
        Worked 60 strokes_ 265.
        Worked 100,000
            strokes_____ 350.
    Dropping point, ° F___ 420.
    Almen machine test—
        Weights carried____ 9.
    Norma-Hoffman Oxi-
        dation test, hours to
        5 p. s. i. drop in oxy-
        gen pressure_____ 210.
```

*Example XI*

The formal of $C_{16}H_{37}$ tertiary mercaptan and $C_{13}$ Oxo alcohol was prepared similarly as described in Example IX. It had a flash point of 420° F., a pour point of 35° F. and a viscosity of 43.3 SSU at 210° F. and 253.5 SSU at 100° F. A grease was prepared as follows.

```
Ingredients:                                Wt. percent
    Complex lithium soap_____ 15.0
    Above formal-mercaptal_____ 84.0
    Phenyl alpha-naphthylamine_____ 1.0
```

*Preparation.*—As in Example IX.

Properties:
- Appearance: Slightly grainy grease which homogenizes smooth.
- Penetrations, 77° F., mm./10—
  - Unworked: 265.
  - Worked: 275.
  - Worked 100,000 strokes: 340.
- Dropping point, °F: 435.
- Almen machine test—
  - Weights carried: 10.
- Norma-Hoffman Oxidation test, hours to 5 p. s. i. drop in oxygen pressure: 192.

The invention is not limited to the specific figures of the foregoing examples. The relative proportions of the materials used may be varied within the limits indicated in the specification to obtain products of varying characteristics.

What is claimed is:

1. A normally liquid material useful as a synthetic lubricant having the general formula:

$$(RS)_2CHR'$$

wherein R is a hydrocarbon radical derived from a mercaptan and is selected from the group consisting of n-octyl and t-dodecyl alkyl groups and R' is the hydrocarbon radical attached to the CHO group of a branched-chain aldehyde selected from the group consisting of octylaldehyde and tridecanal.

2. A normally liquid material according to claim 1, wherein said octylaldehyde and tridecanal are prepared by the catalytic carboxylation of an olefin with carbon monoxide and hydrogen in the Oxo process.

3. A normally liquid material according to claim 1, wherein said octylaldehyde is 2-ethylhexylaldehyde.

4. A material according to claim 1, wherein R is an n-octyl alkyl group and said aldehyde is octylaldehyde.

5. A material according to claim 1, wherein R is a tertiary dodecyl alkyl group and said aldehyde is octylaldehyde.

References Cited in the file of this patent

UNITED STATES PATENTS

| Number | Name | Date |
|---|---|---|
| 2,223,693 | Martin | Dec. 3, 1940 |
| 2,318,629 | Pratton | May 11, 1943 |
| 2,346,153 | Denison et al. | Apr. 11, 1944 |
| 2,361,803 | Wilson | Oct. 31, 1944 |
| 2,369,612 | Schirm | Feb. 13, 1945 |
| 2,415,002 | Bruson | Jan. 28, 1947 |
| 2,442,341 | Crouch | June 17, 1947 |
| 2,450,221 | Ashburn et al. | Sept. 28, 1948 |
| 2,522,669 | Frank | Sept. 19, 1950 |
| 2,543,325 | Mattson | Feb. 27, 1951 |
| 2,552,510 | Barker | May 15, 1951 |
| 2,556,134 | Croxall | June 5, 1951 |
| 2,560,531 | Kipnis | July 17, 1951 |
| 2,562,144 | Harmon et al. | July 24, 1951 |